United States Patent Office 3,478,061
Patented Nov. 11, 1969

3,478,061
METHOD OF PRODUCING 3,4-BENZOCOUMARINS
William H. Starnes, Jr., Baytown, Tex., assignor to Esso Research and Engineering Company
No Drawing. Continuation-in-part of application Ser. No. 573,851, Aug. 22, 1966. This application Feb. 13, 1967, Ser. No. 615,357
Int. Cl. C07d 7/28, 7/24
U.S. Cl. 260—343.2        6 Claims

ABSTRACT OF THE DISCLOSURE

Aroyloxy and aryl free radicals are continuously generated from biphenyl-2-carboxylic acid by continuous or incremental addition of a free-radical initiator into the reaction mass. The aroyloxy free radicals form 3,4-benzocoumarins by intramolecular cyclization, and aryl free radicals form terphenyls by reaction with the reaction solvent. A novel terphenyl compound, isomeric dichloro triphenyl, is useful as a heat-transfer agent, particularly in nuclear reactors.

CROSS-REFERENCES TO RELATED APPLICATIONS

This application is a continuation-in-part of copending application Ser. No. 573,851 (filed Aug. 22, 1966), now abandoned, which was a division of copending application Ser. No. 227,551 (filed Oct. 1, 1962), now matured to U.S. 3,341,569.

BACKGROUND OF THE INVENTION

Field of the invention

This invention relates to the free-radical reaction of a biphenyl carboxylic acid to obtain benzocoumarins which are useful as a modifier for alkyd resins and as plasticizers for solid polymeric products. It also relates to a novel terphenyl compound, isomeric dichloro triphenyl, useful as a heat-transfer agent, particularly in nuclear reactors.

Description of the prior art

By the practice of the prior art, the use of free-radical initiators in organic reactions has been limited to the initial portion of the reaction only, with the intent that the thus initiated reaction should continue without further addition of the initiator. However, in connection with the present invention, it has been found that addition of small amounts of initiator at the beginning of the reaction does not yield the desired result. Further, aromatic carboxylic acids have heretofore not been thought to be suitable sources of aryl or aroyloxy radicals. By the present invention, aromatic carboxylic acids are made suitable for such use.

SUMMARY OF THE INVENTION

By practice of the present invention, an aromatic carboxylic acid (as the free-radical source) is contacted in the liquid reaction phase with a free-radical initiator, a cobalt catalyst, and oxygen. Atmospheric pressure is preferred, although superatmospheric pressure may be required to maintain certain solvents (such as benzene) in the liquid phase at the reaction temperature. A coreactant liquid is maintained in the liquid reaction phase to "trap" the free aryl radicals by reacting with them as they are formed. The initiator is continuously or periodically added to maintain an effective amount in solution in the liquid phase. By this process, aroyloxy and aryl free radicals are continuously presented for reaction within the liquid reaction phase.

Catalyst

The cobalt catalyst may suitably comprise compounds which are soluble within the reaction liquid phase at the reaction temperatures. Generally, they will be cobaltous compounds. Exemplary catalysts are cobalt naphthenate, cobalt stearate, cobalt octanoate, cobalt acetylacetonate, etc. There are no upper limits on the amount of catalyst which may be employed, although it is desirable to have at least about 0.1 weight percent of catalyst present in the reaction liquid so that reasonable yields of the desired products may be obtained without the use of excessive amounts of initiator. An economic upper limit of about 5% is reasonable.

Initiator

Suitable free-radical initiators for use in the present process are found in organic peroxides and hydroperoxides such as di-t-butyl peroxide, cumyl hydroperoxide, dicumyl peroxide; peracids such as peracetic, performic, perbenzoic, etc.; and in general, any organic compound which would form peroxidic compounds under the oxidizing conditions utilized in the practice of this invention. During the reaction, a total of at least one-half mol of initiator per mol of acid-free radical source must ordinarily be added in order to obtain practical conversions to the desired products. It is to be stressed that the initiator is added continuously or in small portions rather than all at once. It is preferred to maintain the concentration of initiator in the liquid reaction mass within the range of 0.01% to 20%. The optimum concentration of initiator will depend, of course, on the particular initiator employed and the particular reaction desired. The total amount of initiator should be greater than about 0.5 mol per mol of acid free-radical source.

Acid

The source of the free aryl or aroyloxy radical in the process of the present invention is an aromatic acid free of substituent groups which are readily oxidizable under the reaction conditions, or which are capable of facile reaction with the free radicals which arise from the use of the initiator. In the general reaction set out in the parent application, suitable sources of the aryl or aroyloxy radicals are aromatic compounds such as benzoic acid, halogen-substituted benzoic acids, t-butyl-substituted benzoic acids, nitro-substituted benzoic acids, biphenyl carboxylic acids, naphthoic acids, and heterocyclic acids such as the pyridine, furan, and thiophene carboxylic acids. Aliphatic acids are expressly excluded because of their reactivity with oxygen under the reaction conditions. As mentioned, it is critical in the practice of the present invention that the source of the aryl or aroyloxy radical not contain readily oxidizable substituents, because in this event the oxidation of those groups would compete with the formation and utilization of the desired aryl and aroyloxy radicals. In the process of the present application, the acid is biphenyl-2-carboxylic acid and substituted derivatives thereof, which fall within the class defined above.

Solvent

The solvent which is to be used to trap the evolved aryl or aroyloxy radicals may suitably be any material which is reactive toward these radicals, which is liquid at the reaction temperature, and which is not readily oxidized under the conditions of the present reaction (i.e., not at a rate such that this oxidation reaction would compete with the formation and utilization of the desired aryl or aroyloxy radicals in the manner proscribed with respect to the free-radical source). Exemplary coreactant solvents are benzene, chlorobenzene, the isomeric dichlorobenzenes, nitrobenzene, t-butyl benzene, pyridine, quinoline, biphenyl, naphthalene, and methyl benzoate. For the production of the dichloroterphenyl product of the present invention, the dichlorobenzenes are used as a solvent. When 3,4-benzocoumarin is desired as a product, other solvents can be employed as well. The mol ratio of coreactant to the acid free-radical source is at least about 2 to 1 but may be made as high as desired.

The reaction is carried out at temperatures and pressures sufficient to maintain the reaction mixture in the liquid phase. Temperatures within the range of 120° C. to 300° C. may be used, preferably within the range of 170° C. to 200° C. It is desirable to maintain the temperature near the reflux temperature of the liquids used at the pressure employed. Any pressure, atmospheric, subatmospheric or superatmospheric may be utilized.

Oxygen, either pure or in admixture with inert gases, such as in air, is added at a rate such that the liquid phase remains saturated with oxygen. The actual rate required will depend on the particular reaction which is being performed.

In the practice of the present invention, it is preferred to remove easily vaporized materials continuously from the reaction zone. This allows the maintenance of higher temperatures in the reaction zone and also removes water, which may act as a catalyst deactivator. A recycle stream may be utilized for returning high-boiling material to the reaction zone, in which case it is preferred to pass the recycle stream over a drying agent such as calcium sulfate, calcium chloride, silica gel or other well-known drying agents.

The generated aryl or aroyloxy free radicals are utilized by trapping them by reaction with the coreactant solvent. The nature of the final product obtained by this coreaction depends upon the nature of the free radical source and of the coreactant solvent. In the present invention, aroyloxy and aryl free radicals are obtained from biphenyl-2-carboxylic acid. The aroyloxy free radical reacts with itself to produce 3,4-benzocoumarin, while the aryl free radical reacts with the solvent to produce a terphenyl:

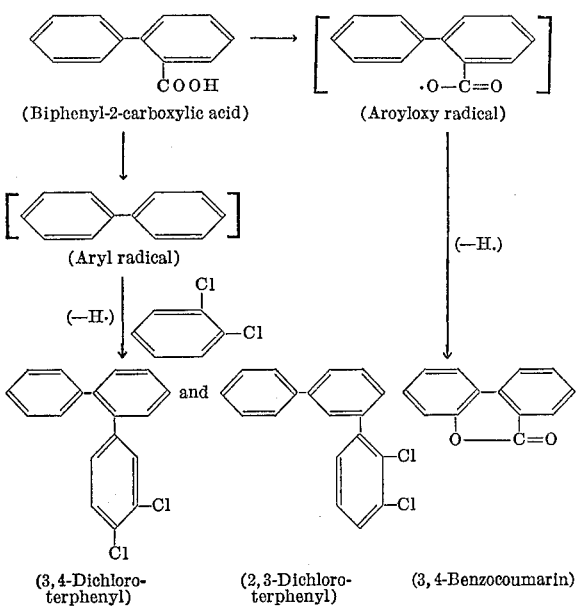

Note that thea royloxy radical does not react with the dichlorobenzene solvent nor with other free radicals. Instead, by reaction of the carboxylic substituent with an unsubstituted ring carbon, the benzocoumarin product is obtained. If the biphenyl-2-carboxylic acid had been substituted, the product would be a benzocoumarin with the same substituents. For example, the following substituted acids would yield the indicated products:

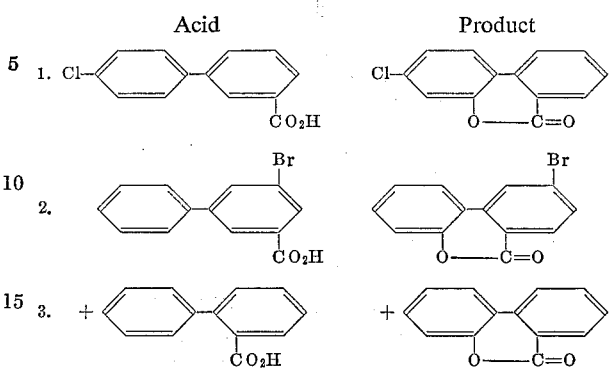

For the production of both the 3,4-benzocoumarin and the terphenyl, unsubstituted biphenyl-2-carboxylic acid is preferred as the acid, and o-dichlorobenzene is preferred as the solvent. As exemplary of the present invention, the following example is given.

Example

A solution of 25.0 g. (0.126 mol) of biphenyl-2-carboxylic acid, 5.0 g. of cobaltous naphthenate (material containing 6% cobalt), and 200 ml. (1.77 mols) of o-dichlorobenzene was treated in the usual manner with 25.0 liters/hr. of oxygen over a reaction period of 7.0 hours at 172° C. to 179° C. Di-t-butyl peroxide (66.5 ml., 0.360 mol) was continuously and uniformly added over the 7.0 hour reaction period. The mixture was cooled to about 25° C., filtered, and extracted thoroughly with saturated aqueous sodium bicarbonate, to form an aqueous layer and an organic layer. The organic layer was separated and then stirred at reflux temperature with 200 ml. of 5% aqueous sodium hydroxide for 20 minutes. The product of the reflux reaction was separated into an aqueous layer and an organic layer, the organic portion being extracted with an additional 100 ml. of 5% sodium hydroxide. The sodium hydroxide aqueous layers were then combined, acidified to a pH of 2 with concentrated hydrochloric acid and extracted with several portions of ether until the ether layer remained water-white. The combined ether layers were extracted with 250 ml. of saturated aqueous sodium bicarbonate, dried over anhydrous calcium sulfate, and then evaporated to dryness to afford 5.3 g. of crude 3,4-benzocoumarin. This represented a yield of 21%, based on the biphenyl-2-carboxylic acid charged. Recrystallization from petroleum ether (boiling point 30–60° C.) afforded the pure material (a yield of about 10%) in two crops having melting points of 93–94° C. and 91–93° C. The identity of this material was established by mixed melting-point determinations and infrared spectra.

The organic fraction remaining after extraction with sodium hydroxide was shown by mass spectral analysis to contain a considerable amount of dichloroterphenyl (a mixture of the two possible isomers). An additional constituent, isolated by fractionation at reduced pressure, was biphenyl (5% yield based on the starting acid charged).

The invention should not be limited to the scope of the specific example given, but only by the appended claims.

I claim:
1. A method for obtaining substituted and unsubstituted 3,4-benzocoumarin which comprises forming in a solvent a solution of a substituted or unsubstituted biphenyl-2-carboxylic acid and from 0.01 weight percent to 5 weight percent of a cobaltous catalyst,
wherein the acid is free of substitutent groups which are readily oxidizable under the reaction conditions or which are capable of facile reaction with the free radicals initiated in the course of the reaction, wherein the solvent is chosen from the group consisting of benzene, chlorobenzene, the isomeric dichlorobenzenes, nitrobenzene, t-butylbenzene and methyl benzoate, wherein the cobaltous catalyst is chosen from the group consisting of cobalt naphthenate, cobalt stearate, cobalt octanoate, and cobalt acetylacetonate, and wherein the mol ratio of solvent to acid is at least about 2 to 1, contacting said solution at a temperature of about 170° C. to 200° C. with oxygen at a mole ratio of about 9 mols of oxygen per hour per mole of acid, while adding continuously enough of a free-radical initiator to maintain the concentration of the initiator in the solution within the range from 0.01 weight percent to 20 weight percent, said initiator being chosen from the group consisting of organic peroxides, hydroperoxides and peracids, whereby a 3,4-benzocoumarin product is obtained.

2. A method in accordance with claim 1 wherein the solvent is o-dichlorobenzene.

3. A method in accordance with claim 1 wherein the initiator is di-t-butyl peroxide.

4. A method in accordance with claim 1 wherein the catalyst is cobalt naphthenate.

5. A method of obtaining 3,4-benzocoumarin which comprises forming a solution of biphenyl-2-carboxylic acid with o-dichlorobenzene in a mol ratio of about 14 mols of o-dichlorobenzene per mol of biphenyl-2-carboxylic acid, with about 2% by weight of cobaltous catalyst in said solution, contacting said solution at a temperature of about 172° C. to about 179° C. with oxygen in a mol ratio of about 9 mols of oxygen per hour per mol of acid, while adding continuously about 3 mols of di-t-butyl peroxide per mol of biphenyl-2-carboxylic acid, over a reaction period of about 7.0 hours, whereby 3,4-benzocoumarin is obtained as a product.

6. A method in accordance with claim 5 wherein the catalyst is cobalt naphthenate.

References Cited
UNITED STATES PATENTS 3,106,567  10/1963  Hawthorne et al. ____ 260—343.2

JAMES A. PATTEN, Primary Examiner

U.S. Cl. X.R.

260—649; 252—67